(12) United States Patent
Cornell

(10) Patent No.: US 10,059,483 B2
(45) Date of Patent: Aug. 28, 2018

(54) BOTTLE WITH DRY STORAGE COMPARTMENT FOR PERSONAL EFFECTS

(71) Applicant: David Cornell, Temecula, CA (US)

(72) Inventor: David Cornell, Temecula, CA (US)

( * ) Notice: Subject to any disclaimer, the term of this patent is extended or adjusted under 35 U.S.C. 154(b) by 0 days.

(21) Appl. No.: 15/379,393

(22) Filed: Dec. 14, 2016

(65) Prior Publication Data

US 2017/0166346 A1 Jun. 15, 2017

Related U.S. Application Data

(60) Provisional application No. 62/267,193, filed on Dec. 14, 2015.

(51) Int. Cl.
| | | |
|---|---|---|
| B65D 1/04 | (2006.01) |
| B65D 21/02 | (2006.01) |
| B65D 47/06 | (2006.01) |
| A45F 3/16 | (2006.01) |
| A45C 11/00 | (2006.01) |
| B65D 41/04 | (2006.01) |
| A45C 11/18 | (2006.01) |
| B65D 1/02 | (2006.01) |
| B62J 11/00 | (2006.01) |

(52) U.S. Cl.
CPC ............ B65D 1/04 (2013.01); A45C 11/00 (2013.01); A45C 11/182 (2013.01); A45F 3/16 (2013.01); B62J 11/00 (2013.01); B65D 1/0246 (2013.01); B65D 21/0204 (2013.01); B65D 41/04 (2013.01); B65D 47/06 (2013.01); *A45C 2011/002* (2013.01)

(58) Field of Classification Search
CPC ........ B65D 1/04; B65D 1/0246; B65D 47/06; B65D 21/0204; B65D 41/04; B62J 11/00; A45C 11/182; A45C 11/00; A45C 2011/002; A45F 3/16
USPC ............... 220/703, 23.83–23.89, 500–557, 220/600–638; 215/6, 205
See application file for complete search history.

(56) References Cited

U.S. PATENT DOCUMENTS

| | | | | | |
|---|---|---|---|---|---|
| 3,012,686 | A | * | 12/1961 | Russell | A47J 41/02 215/12.1 |
| 4,600,111 | A | * | 7/1986 | Brown | A47G 19/2272 215/11.1 |
| 5,282,541 | A | * | 2/1994 | Chen | A47G 19/2266 215/12.1 |
| 6,390,319 | B1 | * | 5/2002 | Yu | B65D 81/24 215/6 |
| 6,520,470 | B1 | * | 2/2003 | Chan | A47K 5/12 215/376 |
| 2009/0080180 | A1 | * | 3/2009 | Bertken | A47G 19/2227 362/101 |

* cited by examiner

Primary Examiner — Kareen Thomas
(74) Attorney, Agent, or Firm — Dann K. Harms

(57) ABSTRACT

A portable beverage container is provided by an assembly which is formed of a first container for liquids which is removably engageable with a second container for personal property such as a smartphone. The first, when removably engaged to the second container, forms the assembly having an exterior surface configured for removable engagement within a bike bottle cage or hydration belt or pack worn by a user.

14 Claims, 6 Drawing Sheets

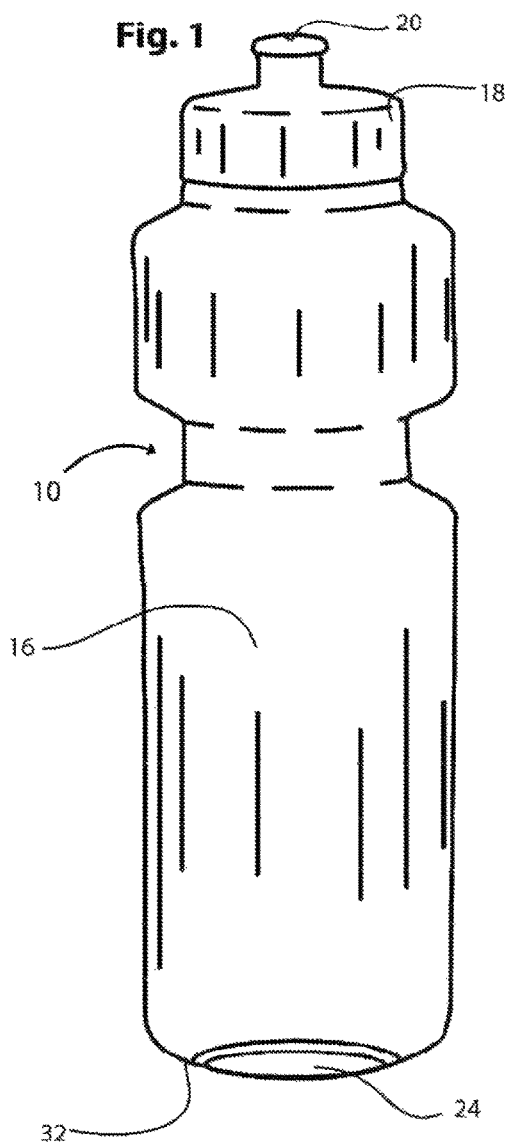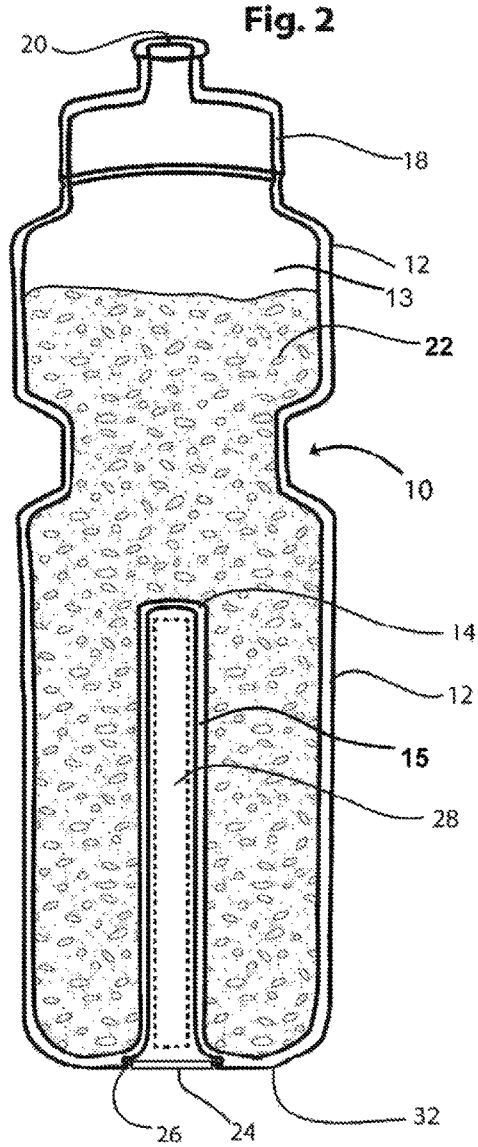

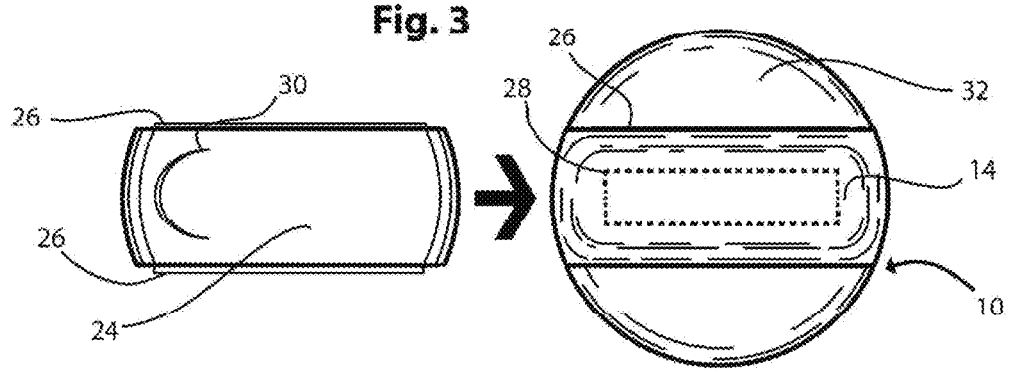
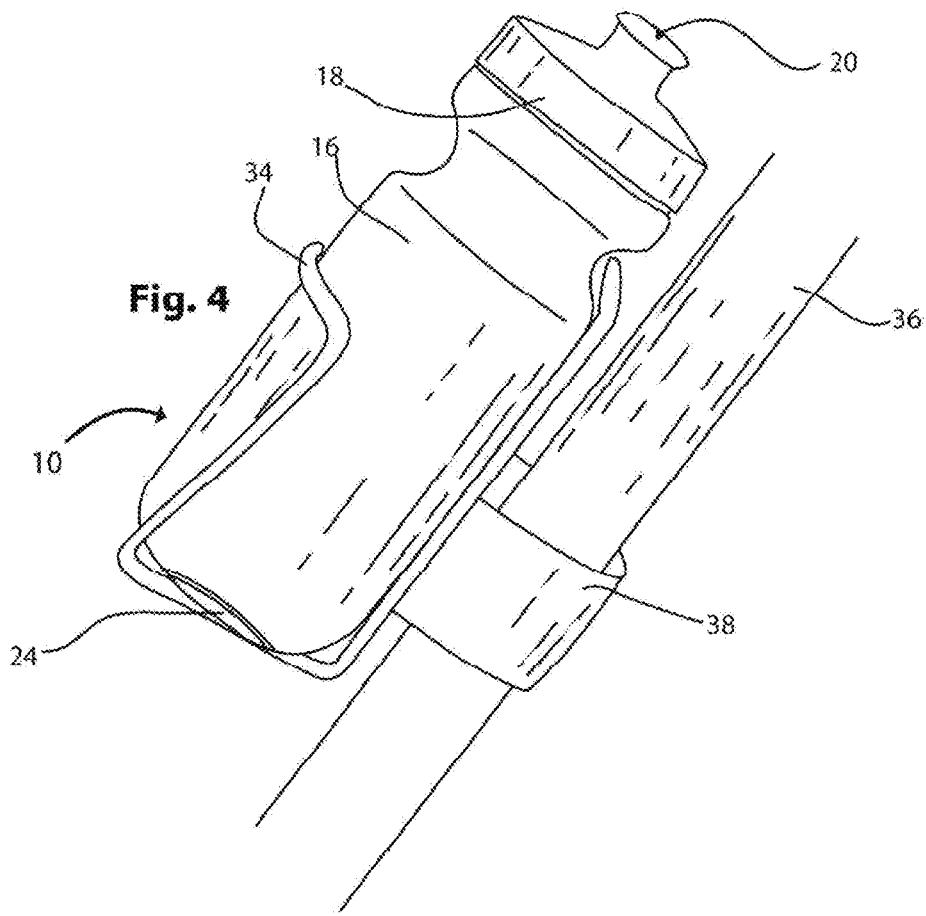

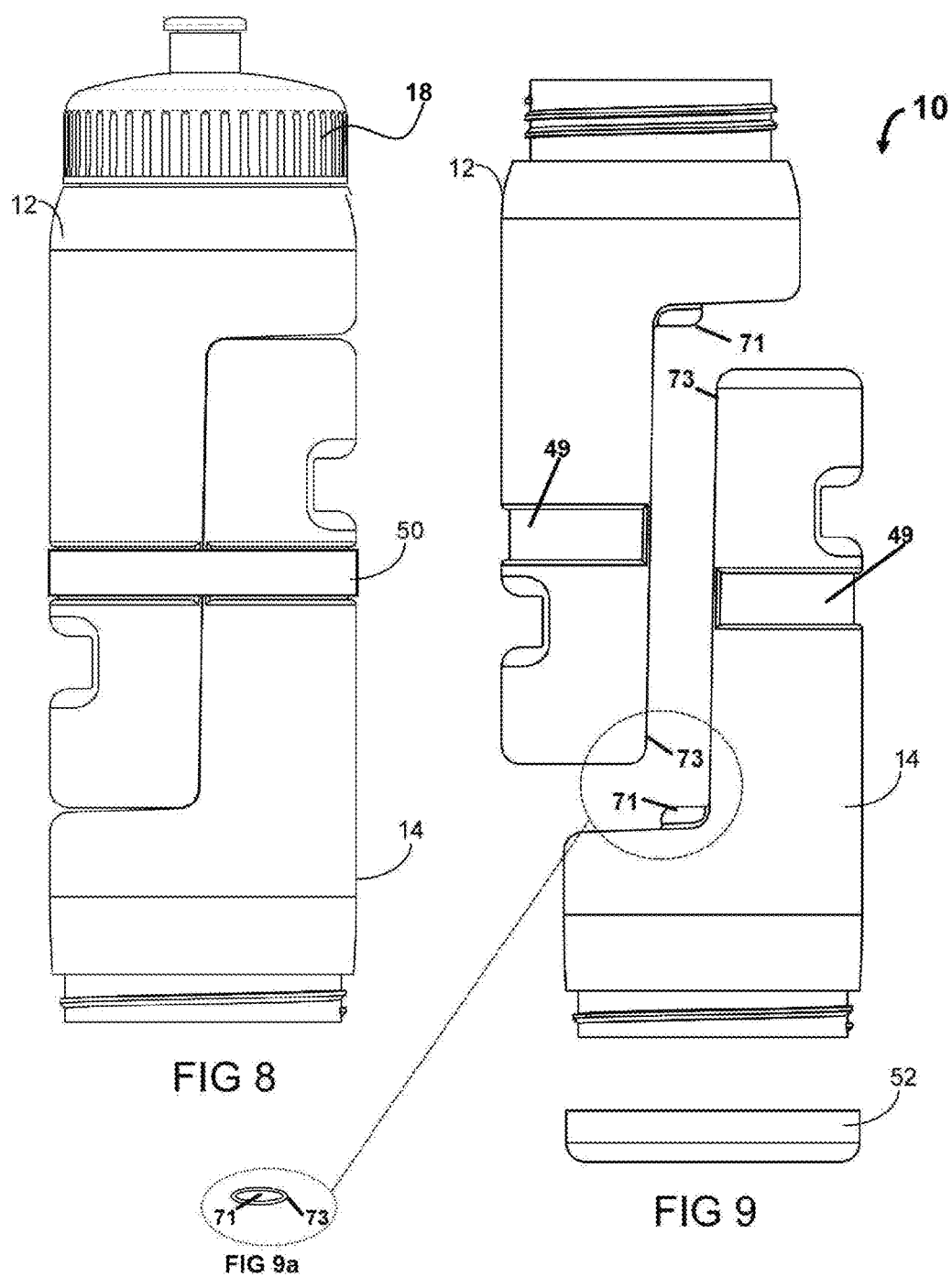

BOTTLE WITH DRY STORAGE COMPARTMENT FOR PERSONAL EFFECTS

This application claims priority to U.S. Provisional Patent Application Ser. No. 62/267,193, filed on Dec. 14, 2015, which is incorporated herein in its entirety by this reference thereto.

BACKGROUND OF THE INVENTION

1. Field of the Invention

The present invention relates to an improved container device for the storage of beverages. More particularly, it relates to a device which will store beverages and provides a separable compartment for personal effects in separate compartments. The device allows the portable and stealth storage of items such as cell phones, wallets or credit cards in a first container adapted for engagement to a container for liquid beverages intended for consumption during athletic activities such as bicycle riding, running or the like. Being removably engageable the device allows for customization of the container contents while also alleviating the need for storage of such in pockets.

2. Prior Art

Because of the need for hydration portable beverage containers exist in prior art in many forms. These containers may be used to transport fluids through a myriad of environments and venues. Such environments may consist of physically active situations such as running or hiking or biking. Portable beverage containers also exist in prior art with varying dispensing mechanisms for their intended purposes along with adaptations for engagement to the person of the user or to a vehicle ridden by the user for example, bicycles.

In strenuous sports, in addition to the need for a portable water or fluid supply, a vexing problem continues to exist. In many situations where people engage in strenuous physical activity, there continues to be a need to carry personal effects such as phones, currency and personal identification. However, this results in a problem in that in sports such as biking or competitive running, the clothing worn is generally aerodynamic and is tight fitting. Bikers for example suffer a problem of limited or no pockets for storage of such personal effects and especially cellular phones which can be quite large.

A preferred method of transporting portable beverage containers on bicycles, and for long distance running or hiking, is the standard squirt bottle containment structure that is found on most bicycles used for racing and for pleasure riding. However, engagement of such squirt bottles with a frame or clothing mounted bottle holder provides no onboard means for storage of personal effects. As a consequence, a secondary container such as a saddle bag, satchel, or under-seat pouch must be used or the rider must wear clothing with pockets or a backpack.

During such athletic endeavors, pockets containing phones and identification and the like can become uncomfortable in the seated environment of biking or in while walking or running long distances, with the constant leg and body motion required. The use of a backpack or saddlebags, however is not a favored option since they add weight and tend to cause aerodynamic drag which is unwanted by competitive and even pleasure riding bikers.

There exists in prior art devices that may hold both beverages and dry products, and could provide a solution to the conflict of carrying beverages and personal effects, but their designs fall short. One such device is found in US Publication 20130270144 A1 by Nader Nowzari where a consumer product has a single container which possesses a primary compartment on an interior and an exterior accessible secondary compartment for the storage of other items. However, in Nowzari's device there is also a dependency upon a one-time use adhesive and film covering to contain items within the secondary compartment. This proves to be inadequate for the storage of valuable and fragile items such as smartphones.

In prior art is also taught in U.S. Pat. No. 6,989,168 (Fahey) which describes another dual compartment single housing beverage container intended for consumer products. This device possesses many of the same limitations as the Nowzari device where it is a non-separable unitary structure intended for limited reuse and is more intended for the sale and distribution of liquid beverages with dry counterparts such as snacks. Neither prior art device offers separability of two containers adapted for such removable engagement which allows for customization depending on the task at hand.

Additionally in the Fahey device description, there also is a cartridge and pull tab method of containment in the secondary compartment. This is unfavorable in active environments as the cartridge may be lost or damaged, and the pull tab is intended for a single use to remove a foil or plastic film.

In other prior art such as U.S. Pat. No. 3,732,999 (Rounkles) another bottle container formed in a unitary structure with an external compartment is described. Here Rounkles teaches a bottle with an exterior positioned compartment that possesses a hinged door to seal the compartment for the object of mixing powder with the liquid in the container. However, the Rounkels device, as noted, is for powder storage on an exterior surface and will have difficulties fitting within a bottle configured for standard beverage container containment structures used on bicycles, and lacks a simple retrieval mechanism enabling one-handed operation or removal from the bottle without a dismount.

As such, there is a continuing and unmet need for improvement in the field of beverage containers for physically demanding activities where fluids and non fluids are to be carried by the user such as in the riding of bicycles. Such a device should enable a user to carry personal effects such as smartphones and personal identification so they do not need pockets. Such a device should endeavor to improve on the reusability, one-handed operation and the containment capability with respect to dry stored items. Such a device should also provide for a structure having two containers with separate internal cavities, but allow for easy removal and replacement of the container housing a carried item and the carried item itself, to the bottle of the formed container, either through engagement along a bottom edge or along a side edge allowing such removal while the bottle is engaged in a holder.

Further, such a device ideally should be customizable by the user for the anticipated task or exercise through the provision of a fluid cavity in a first container and item cavity in a second housing or container, which are adapted for removable engagement to form a single unit to carry fluids and personal effect.

SUMMARY OF THE INVENTION

The device herein disclosed and described achieves the above-mentioned goals through the provision of a reusable multi-compartment and configurable beverage container with a first compartment housing having a first cavity intended for the storage and dispensing of liquids. This first or primary housing having the first internal cavity for fluids is adapted on an exterior surface for engagement to a second container housing having a secondary compartment configured for the temporary storage of personal effects. A cavity of this secondary container is adapted for holding personal items such as smartphones and personal identification either in a stealth mode positioned along the axis of the formed container which appears from a distance as a bottle or in a semi-stealth mode where the personal effects are removable through a sidewall of the bottle.

In one mode of the device, the secondary compartment is adapted for removable engagement in a removable connection to the first or primary container by forming within the first compartment of a receiving cavity which is complimentary to the exterior form of most smartphones and identification cards or a container therefor. In a mode of the device herein providing bottom entry opposite the first opening for fluid dispensing, and a stealth containment, the device also includes an engageable cover for the secondary compartment or cavity. This secondary compartment is adapted in form to hold any items placed within, whereafter the cover is engaged and constrained by complimentary channel systems or threaded engagement. In other modes of the device, a side entry may be provided which allows removal and replacement of articles into the dry cavity through a sidewall of the container and can be used with the container engaged in a holder.

In all modes of the device the secondary compartment having a second cavity is separated from the first compartment having a first internal cavity by fluid impermeable walls and provides access thereto through an aperture in the side wall or bottom wall of the bottle. Further, the device can include a conventional squirting first cap and conventional bicycle water bottle exterior form so that it may fit within common bicycle water bottle containment structures known as a bottle cage.

In one preferred embodiment of the device a container is formed which offers a stealth containment of valuables or electronics using a secondary compartment which is oriented axially within or along one side of the axis or longer length orientation of the device herein. The axially positioned secondary compartment is thus, substantially hidden in the bottle-appearing device, and provides access thereto through an aperture located at an opposite end to the opening through which the user drinks. This aperture may be temporarily sealed by a removably engageable cover thereby securing stored personal effects within the cavity formed by its impermeable walls. This removably engageable cover may serve other purposes as well such as holding one's keys in a molded containment area or acting as a bottle opener or the like.

In another preferred mode of the device, the secondary compartment may be axially located as a formed area of the device with access thereto provided through a sidewall of the container. This mode can simply have a secondary compartment or can employ a secondary container complimentary in exterior dimensions to the size to the compartment wherein it will slide or rotate into the formed compartment.

In a particularly preferred mode of the device, the first or primary container has a first cavity for holding fluids. The first cavity is in communication with a first opening which can be engaged with a cover or fluid dispensing cover. The second container for holding personal items is formed as a substantial mirror image of the first container and is configured upon a mating surface to removably engage against a complimentary mating surface of the first container to an engaged configuration where the device appears as a bottle type container. In this engaged configuration the device has an exterior dimension adapted for a sliding engagement into a bottle holding mount such as used on a bicycle or a sling for holding water bottles. Access to the cavity for personal items housed in the second cavity of the second container, is provided through a removably engaged cap which is on the opposite end of the formed container from the fluid dispensing cap or end.

In all three modes of the device the provision of a second opening on a side or opposite end from the drinking dispensing cap, personal effects such as a phone, wallet, currency or keys, may be placed into the secondary container and can be retrieved easily by simple removal of the second cap or lid covering the second cavity of the second container.

The exterior surfaces of the device which surrounds the first container liquid holding first cavity is formed of a flexible and impermeable plastic or polymeric material. This flexibility of the exterior surfaces forces liquid contained within to evacuate the container through a removable, screw-top squirt-nozzle when a compressive biasing acts upon the device and increases the internal pressure. During the equalization of the increased internal pressure due to the changing volume resulting from the compressive biasing, the liquid inside the first cavity evacuates through the squirt nozzle in a stream. The stream of liquid enables a user to hydrate themselves while moving or stationary.

In a particularly preferred mode of the device it is formed to removably assemble first and second containers and thereby separates the first and second compartments into distinct interconnectable components. The two halves or components are removably engageable using complimentary mating connectors on each half and are held in a biased compressive engagement to maintain the connection between the mating connectors by an encircling elastic band. The device in this preferred mode as described herein, appears unitary in structure when the first and second containers are joined in an engaged configuration and held by the elastic band. However, this mode allows the user to decouple the two halves for individual use. Further, this mode of the device is particularly well-adapted to customization to an anticipated upcoming use, by provision of a plurality of first and second containers where each is adapted for removable engagement to the other. This allows the user to engage half sections for holding fluid and differing personal items from a kit or group thereof.

Employing the device in this mode, the user aligns and engages the complimentary mating connectors such as matching grooves and protrusions in the first and second containers to form a removable engagement which maintains a registered and snug coupling and which prevents separation from rotation or translation of the two halves. An elastic band is provided adapted for a fixed positioning thereround using aligned recesses defined between cylindrical ridges formed on both the first and second container. The user may place their personal items and liquid within a chosen cavity of the first and second containers, and secure such by screwing on the first cap and bottom cap respectively. This mode allows for differing sized openings to the respective interior cavities of each container.

The dimensions of the engaged device in all modes are preferably being such that the exterior surface is dimensioned to fits within common bicycle beverage container holding structures, or the device may be provided with its own holding structure adapted to hold a larger bottle. In some embodiments of this device, a larger modified beverage container holding structure may be used. In this larger embodiment, varying sizes of smartphones and personal effects may be stored within the device due to a larger second cavity.

A further embodiment of this device may be such that the second cavity is formed in such a way that it may contain bicycle repair related components. These components include tools to remove tires from rims to fix flats, cartridges to inflate flat tires, or multi-tools to tune elements such as the de-railer or seat height. The second cavity may also be formed in such a way that it may contain fitness tracking devices to measure distance traveled and estimated caloric loss during bicycle riding. Such tracking and processing elements may be formed into the device itself.

It is an object of this invention to provide a beverage container which holds fluid and also provides for the secure storage and transport of dry personal effects thereby alleviating the need for a user to wear a pack or have pockets.

Another object of this invention is to enable the storage and transport of larger items such as smartphones within a safe and stealth second cavity which is held adjacent a larger primary beverage containing first cavity.

A further object of this invention is to provide two separate and distinct liquid and personal effects storage contains which can be removably engaged to form an engaged configuration with exterior dimensions adapted for positioning within a standard bicycle mounted bottle cage or sling type bottle holder worn by users.

These together with other objects and advantages which become subsequently apparent reside in the details of the construction and operation as more fully hereinafter described and claimed, reference being had to the accompanying drawings forming a part thereof, wherein like numerals refer to like parts throughout.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWING FIGURES

FIG. 1 depicts a perspective view of a mode of the device formed to the exterior dimensions of a bottle with a second container cover secured, and depicting the stealth of the second cavity hidden axially within the first container of the formed bottle.

FIG. 2 depicts a cross-sectional side view of the device in the modes of FIGS. 1-7 showing the axial positioning and also showing access through a bottom wall with a cover.

FIG. 3 depicts an end view of the bottom wall of the assembled device depicting the second container lid removed and ready for engagement with complimentary channel guides.

FIG. 4 depicts a perspective view of the device herein, in a stored position placed within a beverage container holder which is for example fixed to a bicycle frame.

FIG. 8 displays a particularly preferred mode of the device wherein a first container with a first cavity for liquids can be removably separated and joined to the second container having a second cavity for personal items.

FIG. 9 shows the device as seen in FIG. 8 in a disassembled configuration showing the second cap for closing the opening to the second cavity positioned opposite the first cap for covering the opening to the first cavity.

FIG. 9a shows the complimentary interlocking connectors positioned on each half section forming the device which interlock, and prevent axial and rotational translation and separation.

Figure 10:
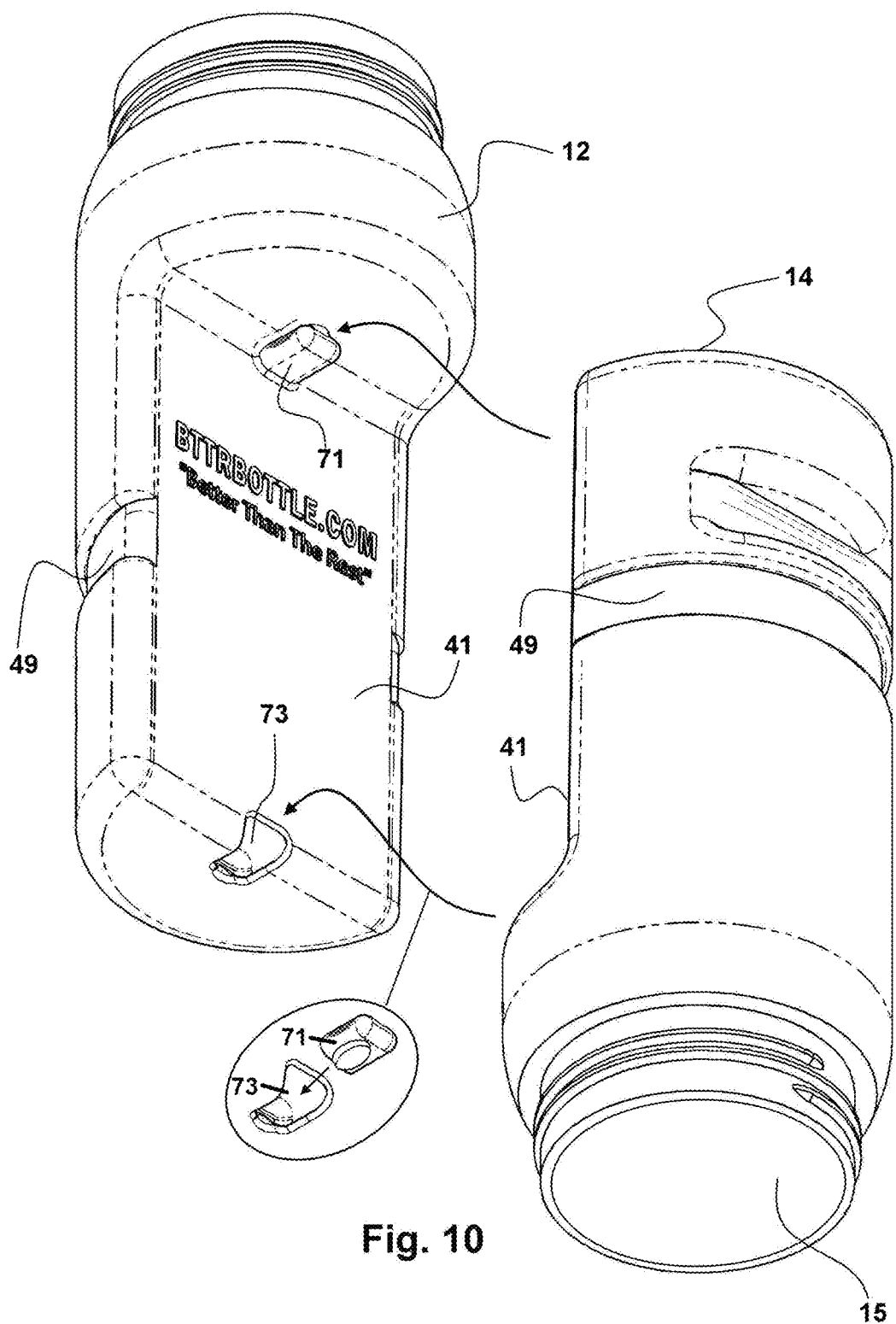

FIG. 10 shows a perspective view of the device as in FIGS. 8-9 and depicts mating surfaces on both the first and second container and T-shaped complimentary interlocking connectors which are positioned on each of the first and second containers to prevent axial and rotational translation when engaged.

DETAILED DESCRIPTION OF THE PREFERRED EMBODIMENTS OF THE INVENTION

Referring now to the drawings of FIGS. 1-10 depict preferred modes of the formed beverage container and personal possession holding device 10. The device 10, when configured to an assembled configuration such as in FIGS. 4 and 8, has a first container 12 having a first cavity 13 adapted for transport, storage and containment of a beverage therein. The device 10 also has a second container 14 having a second cavity 15 configured for transport, storage and containment of personal effects in a dry and stealth positioning within the second container 14.

There is seen in FIG. 1 a top plan view of the beverage container sized device 10 in the preferred mode for all configurations of the device 10 herein, which has and exterior form and shape yielding a diameter and length size adapted to that of conventionally employed water squirt bottles. Such water bottles are well known for their use and for their engagement in conventional bottle holders such as those mounted on a bike, or on belts worn by users who run or walk for exercise and conventionally are sized with a diameter of substantially 73 mm. By substantially 73 mm is meant between 68 mm to 78 mm as some bottle cages for bicycles and hydration belts are adapted with expandable housings. However, between 72 mm to 74 mm would be most preferred as many metal and older bottle cages are metal and require such a diameter to slidably engage therein.

In all modes of the device 10 herein, the first container 12 having the first cavity 13 therein, has a flexible exterior sidewall 16 formed of a polymeric material which surrounds and defines the first cavity 13 of the first container 12 and the dimensions of the exterior surface thereof. While it might be formed of more rigid or metal material, the flexible sidewall 16 renders the device easier to use with one hand. Additionally, common to all modes of the device 10 herein, the second container 14, such as shown in the cross sectional illustration of FIG. 2, is adapted for a removable engagement with the first container 12.

Also, shown in the figures is a first cap 18 with squirt nozzle 20 formed within the first cap 18. When a compressive biasing acts upon the flexible exterior sidewall surface 16, fluid 22 contained within the first container 12 is forced through the squirt nozzle 20 of the first cap 18, while the second cavity 15 of the second container 14 remains dry.

As seen in the mode of the device 10 in FIGS. 1 and 4, the exterior side portion of the second lid 24 covering the second cavity 15 of the second container 14, is accessible through the bottom of the first container 12 with the device 10 in an engaged configuration forming an assembly such as in FIG. 4. In this mode of the device 10 with the bottom access, the operation and features of the second lid 24 are more clearly depicted in FIGS. 2 and 3 where the figures illustrate how the second lid 24 covers the second cavity 15 within the second container 14. This closing secures any personal effects such as a smartphone 28 placed within the second cavity 15 of the second container 14 through the bottom located aperture. Once mounted in the bracket as in FIG. 4, the second container 14 remains hidden from view.

FIG. 3 further illustrates the insertion of the second lid 24 which covers the second cavity 15 where its complimentary channels 26 are exposed. On this second lid 24 there may also be included a gripping depression 30 formed onto its surface that is parallel to the base 32 of the device 10 that facilitates the disengagement of the second lid 24 for easier access to the second cavity 15 and the smartphone 28 contained within.

In FIG. 4 is depicted a preferred configuration of all modes of the device 10 herein. In this engaged configuration of the first container 12 to the second container 14, an assembly, as shown, is formed where the device 10 is adapted for engagement in an as-used position where its exterior surface dimensions have a diameter for insertion into a container holder 34 such as a bottle cage used on a bicycle or waist engaged hydration belt. Such a preferred diameter of the device 10 with removably engaged first container 12 and second container 14 forming an assembly, would be substantially 73 mm as noted above. In other modes, the device 10 may have an engaged configuration with the exterior surface sized to a larger diameter to accommodate a larger embodiment of the device 10. Such might be provided with a matching cage or waist belt bottle holder and thereby allow for larger smartphones 28 or similar personal effects and tools to be stored within the second cavity 15 of the second container 14. This figure also illustrates a preferred embodiment of all modes of the container device 10 herein with the first container 12 removably engaged with the second container 14 in an engaged configuration to form an assembly, as depicted, which is sized to engage within a bottle cage or container holder 34, fixed to a bicycle frame 36 through the use of a clamping bracket 38.

Figure 5:
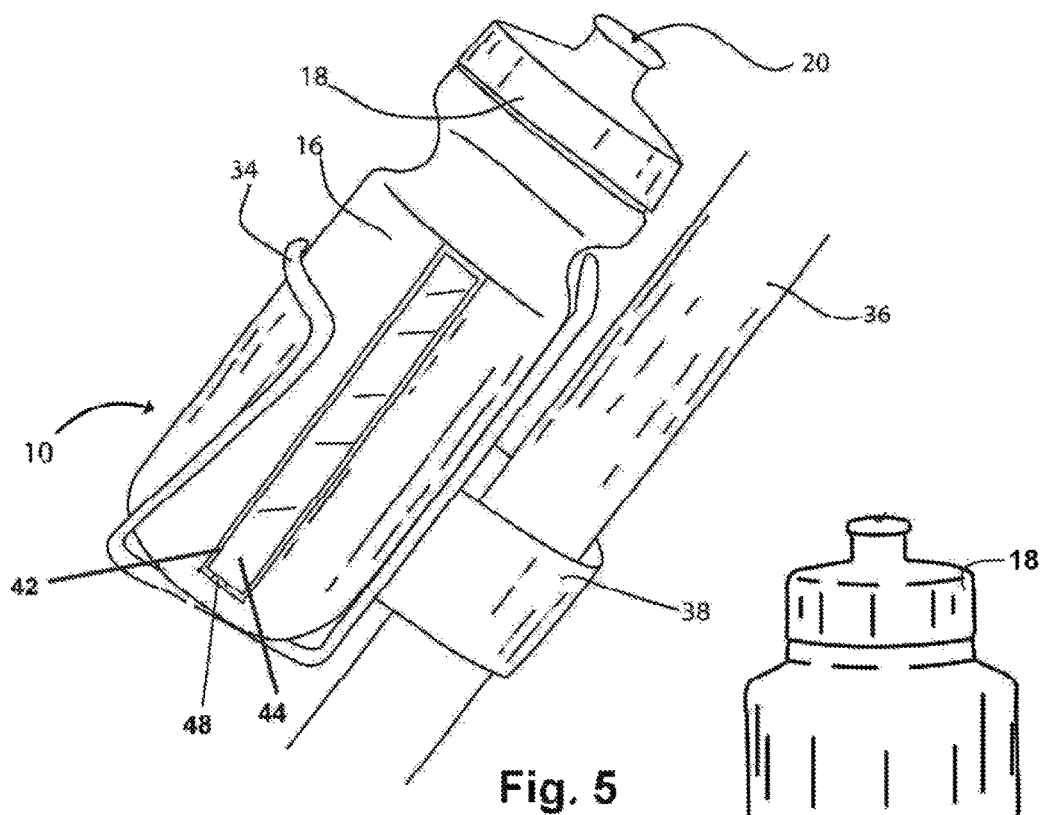
FIG. 5 depicts the device in a manner similar to FIG. 4 but showing an aperture communicating through the sidewall of the first container to allow access while the assembled bottle-shaped device is being held in the holder.

Another mode of the container device 10 is shown in FIG. 5 in an as-used positioning similar to FIG. 4 but showing an aperture 42 for the second container 14 which is formed integral to the first container 12, communicating through the sidewall 16 of the first container 12 and in a registered positioning relative to the holder 34 when inserted. This allows access to the second cavity 15 of the formed second container 14 while the bottle device 10 is in the as-used position being held in the holder 34. This allows the user to remove and reinsert valuables or other personal effects without removing the bottle device 10.

Figure 6:
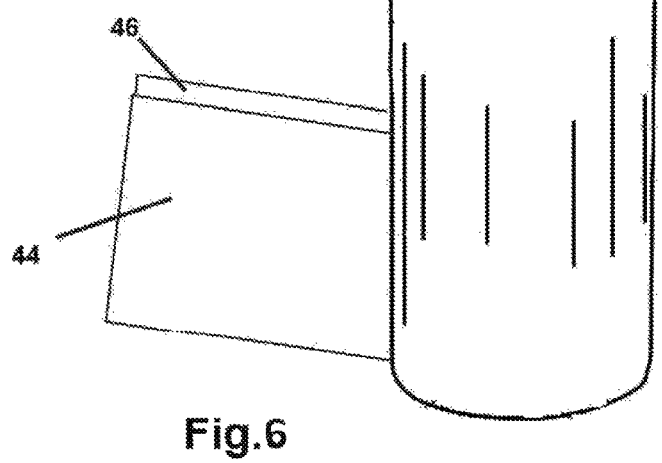
FIG. 6 depicts a mode of the device of FIG. 5, showing a rotatable second container mounted within a complimentary cavity having a second cavity therein for valuables.
Figure 7:
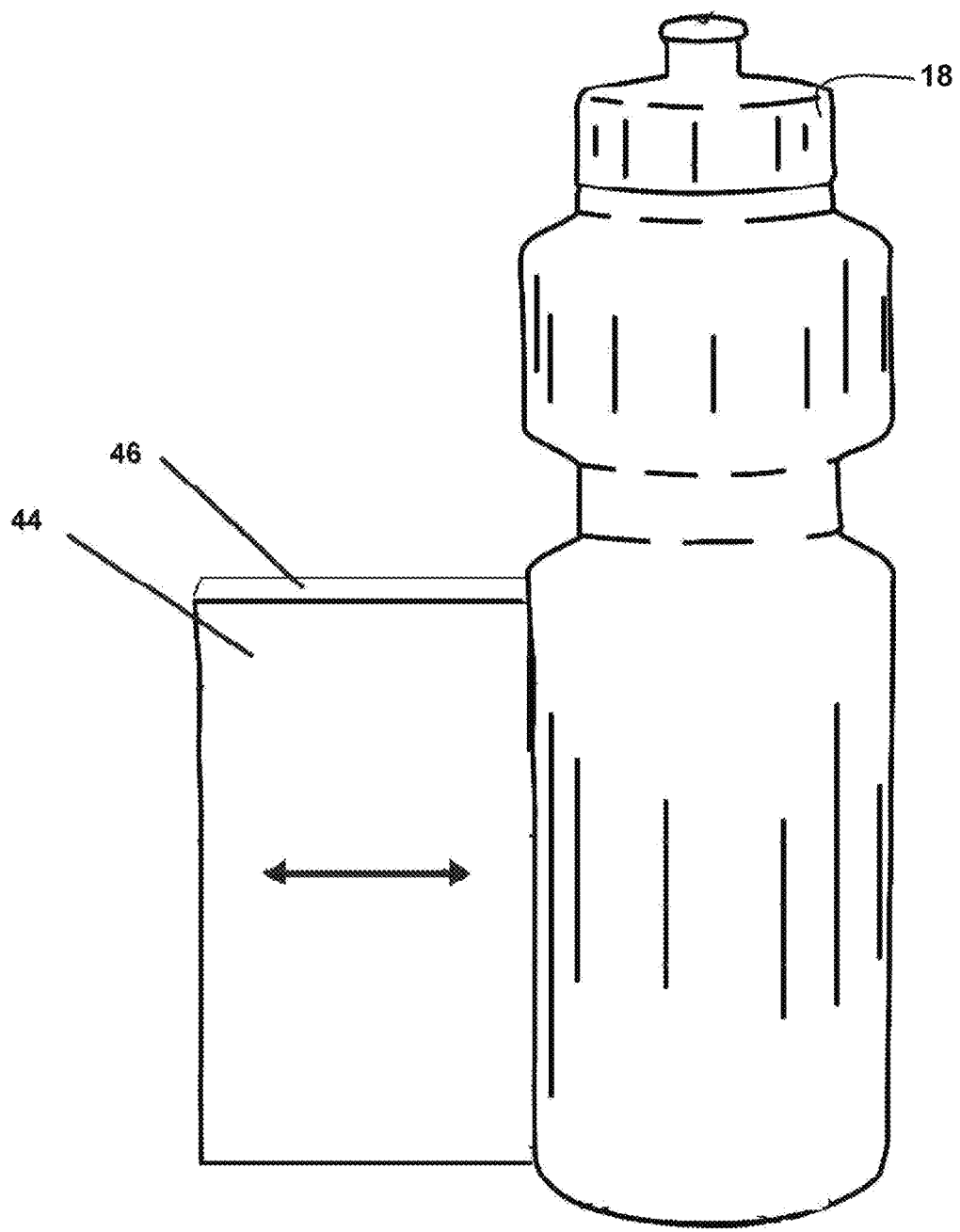
FIG. 7 shows a mode of the device similar to that of FIG. 5 wherein a translating second container having the second cavity slides into and out the complimentary cavity formed in the first container through a side aperture.

A removable housing 44 having a receiving cavity 46 may be fitted for engagement into the second container 14 and as formed and shown in FIGS. 5-6 and to rotate on a hinge 48 into and out of the second cavity 14 or translate into and out of the second cavity 14 as depicted in FIG. 7. A locking mechanism that is pressure released or otherwise, or a simple frictional engagement with the walls forming the second cavity 14 will retain the housing 44 within the second cavity 14. Alternatively, the housing 44 can be removable and re-insertable so as to allow the user to load personal effects into the receiving cavity 46 away from the bottle device 10.

Another preferred mode of configuration of the two container device 10 herein is displayed in FIGS. 8-10. In this mode, the first container 12 and second container 14, are configured into interconnectable components having mating surfaces 41 and complimentary engageable interlocking connectors 71 and 73. In this mode, an elastic or adjustable band 50 is included to hold the first container 12 in biased contact with the second container 14. As with all modes of the device 10, when in the engaged configuration of FIG. 8 to form the depicted assembly, the assembly appears uniform in structure and is sized for removable engagement into a bottle cage or holder. However, this mode allows for the first container 12 to be decoupled from the second container 14, for individual use, and for the provision of a kit featuring a plurality of first and second containers which are removably engageable so the user can store differing items or pre configure the containers for later engagement depending on the anticipated use.

Employing the device 10 as shown in FIGS. 8-10, the user aligns the interlocking connectors positioned on each container, which are shown as recess 73 having an interior surface configuration to accommodate a translating engagement of protrusions 71 therein. Such interlocking connectors are positioned on the first and second containers 12, 14, in positions to operatively engage form disengaged positions and thereby form the device in the engaged configuration forming an assembly as in FIG. 8. The provision of mating surfaces 40 with the translating interlocking connectors in registered positions to operatively connect, allows easy connection of the first container 12 to the second container 14 to a proper registered engagement and snug coupling. The interlocking connectors, shown as recesses 73 and protrusions 71, prevent separation of the two halves by rotation or axial translation of the two containers away from each other.

Thereafter, an elastic band 50 or band 50 which may be cinched and tightened, is seated within the recesses 49 depending into the exterior surfaces of each of the first container 12 and second container 14 when positioned to the engaged position of FIG. 8.

Before or after positioning of the two containers to this engaged position, the user may easily place their personal items within the second cavity 15 of the second container 14, and liquid within the first cavity 13 of the first container 12, and seal such therein by engaging the first cap 18 over the opening to the first cavity 13 and the second cap 52 over the opening to the second cavity 15. The mode of the device 10 as in FIGS. 8-10 is especially preferred because it may be provided as a kit of engageable first containers 12 and second container 14 where a plurality of one or both is provided. In this fashion the user may pre-configure different first containers 12 with different liquids, any of which can be joined to any second container 14 which can also be provided in such a plurality which will allow a user to pre configure second containers 14 with different contents in the second cavities 15 adapted to an anticipated use when joined to a chosen first container 12.

For example a user might wish to have chilled milk in the first cavity 13 of one first container 12, and water or a sports drink in another first cavity 13 of another of the plurality of first containers 12, because the container with the milk will be used for a protein drink after a gym exercise, and the container with water or sports drink will be used for a running exercise. The same pre-configuration of the second containers 14 may be accomplished such as positioning fire starters and a camping knife in one second container 14 for a camping trip, and pre-positioning a wallet and smartphone in another second container 14 to be ready for an early bike ride so as not to forget them.

Also shown in FIG. 10 are a particularly preferred mode of the interlocking connectors. As shown, the recesses 73 depending into the sidewall 16 each of the first container 12 and second container 14 have a shape defined by an interior surface configuration configured to engage protrusions 71 which are T-shaped. This T-shaped protrusion 71 which is in registered positioning to engaged a groove 73 formed into the sidewall 16, has shown to provide a particularly secure engagement of the two containers 12 and 14 once assembled to the engaged configuration of FIG. 8. This configuration was shown in experimentation to provide significantly enhanced resistance to movement of the two containers from each other by rotating around their common axis or translating along the axis formed between the facing surfaces 41 when in the engaged configuration of FIG. 8.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications, variations and substitutions are included within the scope of the invention as defined by the following claims.

What is claimed is:

1. A bottle apparatus comprising:
   a first container having a first interior cavity adapted for holding a liquid therein;
   a second container having a second interior cavity;
   a first cap removably engageable with a first opening communicating with said first interior cavity;
   a second cap removably engageable with a second opening communicating with said second interior cavity;
   said first container having a first facing surface area on an exterior surface thereof;
   said second container having a second facing surface positioned on an exterior surface thereof;
   said first container removably engageable to said second container to an engaged configuration forming an assembly, having said first facing surface adjacent said second facing surface;
   an elastic band;
   said elastic band removably engageable into portions of recesses formed into each of said exterior surface of said first container and said exterior surface of said second container; and
   said first opening being positioned on an opposite end of said assembly from said second opening.

2. The bottle apparatus of claim 1 additionally comprising:
   interlocking connectors positioned on each of said first container and said second container; and
   said interlocking connectors upon said first container removably engaging said interlocking connectors positioned upon said second container with said first container and said second container in said engaged configuration.

3. The bottle apparatus of claim 2 additionally comprising:
   said interlocking connectors positioned on said first container including at least one projection extending from said exterior surface thereof and at least one recess formed into said exterior surface thereof; and
   said interlocking connectors positioned on said second container including at least one projection extending from said exterior surface adapted to engage with said recess formed into said exterior surface of said first container and at least one recess formed into said exterior surface of said second container adapted to engage with said projection extending from said exterior surface of said first container.

4. The bottle apparatus of claim 3 additionally comprising:
   said projections extending from both said exterior surface of said first container and said exterior surface of said second container being T-shaped.

5. The bottle apparatus of claim 1 wherein an exterior surface of said formed assembly is configured to slidably engage within a water bottle holder of a bicycle.

6. The bottle apparatus of claim 2 wherein an exterior surface of said formed assembly is configured to slidably engage within a water bottle holder of a bicycle.

7. The bottle apparatus of claim 3 wherein an exterior surface of said formed assembly is configured to slidably engage within a water bottle holder of a bicycle.

8. The bottle apparatus of claim 4 wherein an exterior surface of said formed assembly is configured to slidably engage within a water bottle holder of a bicycle.

9. The bottle apparatus of claim 8 wherein a diameter of said formed assembly is substantially 73 mm.

10. A bottle apparatus comprising:
    a first container having a first interior cavity adapted for holding a liquid therein;
    a second container having a second interior cavity;
    a first cap removably engageable with a first opening communicating with said first interior cavity;
    a second cap removably engageable with a second opening communicating with said second interior cavity;
    said first container having a first facing surface area on an exterior surface thereof;
    said second container having a second facing surface positioned on an exterior surface thereof;

said first container removably engageable to said second container to an engaged configuration forming an assembly, having said first facing surface adjacent said second facing surface; and said first opening being positioned on an opposite end of said assembly from said second opening;

interlocking connectors positioned on each of said first container and said second container; and said interlocking connectors upon said first container removably engaging said interlocking connectors positioned upon said second container with said first container and said second container in said engaged configuration.

11. The bottle apparatus of claim 10 additionally comprising:

said interlocking connectors positioned on said first container including at least one projection extending from said exterior surface thereof and at least one recess formed into said exterior surface thereof; and said interlocking connectors positioned on said second container including at least one projection extending from said exterior surface adapted to engage with said recess formed into said exterior surface of said first container and at least one recess formed into said exterior surface of said second container adapted to engage with said projection extending from said exterior surface of said first container.

12. The bottle apparatus of claim 11 additionally comprising:

said projections extending from both said exterior surface of said first container and said exterior surface of said second container being T-shaped.

13. The bottle apparatus of claim 10 wherein and exterior surface of said formed assembly is configured to slidably engage within a water bottle holder of a bicycle.

14. The bottle apparatus of claim 10 wherein a diameter of said formed assembly is substantially 73 mm.

* * * * *